United States Patent [19]
Kriz

[11] Patent Number: 4,655,591
[45] Date of Patent: Apr. 7, 1987

[54] PLATFORM ARRANGEMENT WITH MOVABLE MIRRORS, ONE MOVABLE WITH TRACKING MEANS, DIRECTING LIGHT FROM A FIXED LASER SOURCE

[75] Inventor: Helmut Kriz, Ruckersdorf, Fed. Rep. of Germany

[73] Assignee: Diehl GmbH & Co., Nuremberg, Fed. Rep. of Germany

[21] Appl. No.: 822,955

[22] Filed: Jan. 27, 1986

Related U.S. Application Data

[63] Continuation of Ser. No. 609,097, May 10, 1984, abandoned.

[30] Foreign Application Priority Data

May 21, 1983 [DE] Fed. Rep. of Germany ....... 3318686

[51] Int. Cl.$^4$ .............. G01C 3/08; G02B 7/18; G02B 5/08; F41G 3/00
[52] U.S. Cl. .................... 356/152; 350/618; 350/636; 250/203 R; 89/41.06
[58] Field of Search ............... 350/618, 619, 620, 623, 350/624, 626, 636, 287; 248/487; 219/121 LU, 121 LV, 121 LW, 121 LY; 89/41.06; 356/5, 152; 250/203 R

[56] References Cited

U.S. PATENT DOCUMENTS

| | | | |
|---|---|---|---|
| 3,917,381 | 11/1975 | Feigin | 350/620 |
| 3,932,726 | 1/1976 | Verheyen et al. | 219/121 LY |
| 3,986,767 | 10/1976 | Rexer et al. | 350/624 |
| 3,999,832 | 12/1976 | Schlesinger | 350/620 |
| 4,258,246 | 3/1981 | Karube et al. | 219/121 LV |
| 4,270,845 | 6/1981 | Takizawa et al. | 350/636 |
| 4,355,870 | 10/1982 | Orloff et al. | 350/287 |
| 4,387,952 | 6/1983 | Slusher | 219/121 LW |

FOREIGN PATENT DOCUMENTS 1258308 1/1968 Fed. Rep. of Germany ...... 350/623

Primary Examiner—Jon W. Henry
Attorney, Agent, or Firm—Scully, Scott, Murphy & Presser

[57] ABSTRACT

An arrangement for the focusing of a beam projected from a laser source through the intermediary of a movable platform, in which the laser source is mounted apart from the platform support which supports other equipment while being oriented relative to the movements of the platform.

6 Claims, 1 Drawing Figure

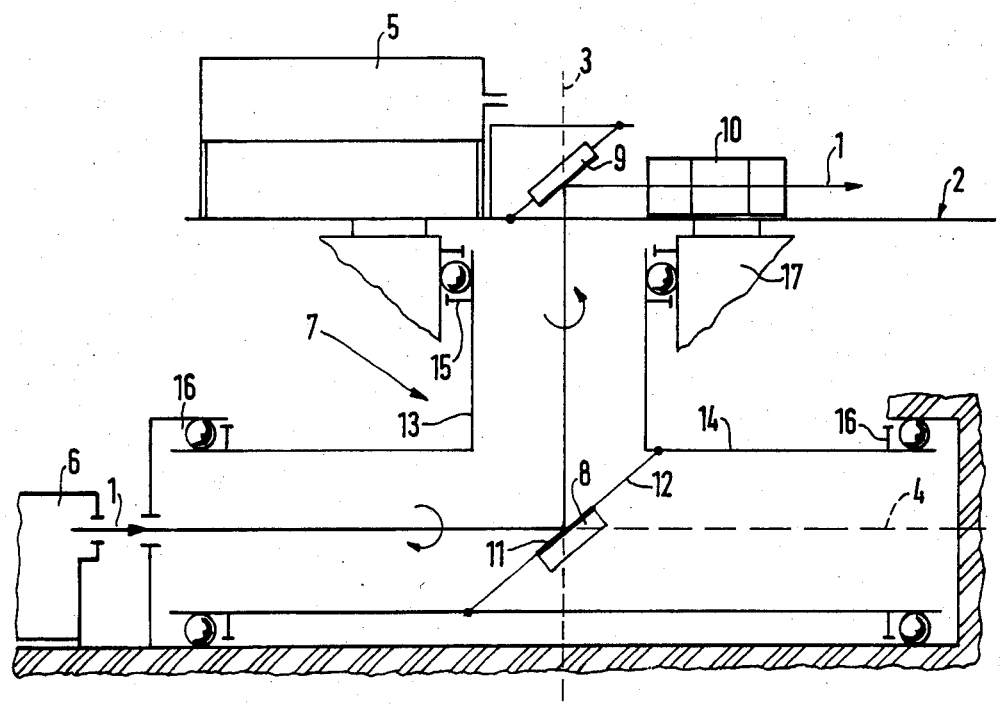

PLATFORM ARRANGEMENT WITH MOVABLE MIRRORS, ONE MOVABLE WITH TRACKING MEANS, DIRECTING LIGHT FROM A FIXED LASER SOURCE

This application is a continuation of application Ser. No. 609,097 filed May 10, 1984, now abandoned.

BACKGROUND OF THE INVENTION

1. Field of the Invention

The present invention relates to an arrangement for the focusing of the beam projected from a laser source through the intermediary of a movably supported platform.

2. Discussion of the Prior Art

An arrangement of the above-mentioned type for the focusing of a laser beam has become known from the disclosure of German Published Patent Application No. 27 57 585, and particularly the first paragraph in Column 2 in the German publication. For the spatial or three-dimensional orientation of a projected laser beam, a laser source is mounted therein on the platform which provides for the required pivoting degree of freedom. However, frequently such a platform is also the equipment carrier for further equipment, such as directional and target-tracking installations, which must constantly maintain a fixed orientation relative to the orientation of the projected laser beam; for example, a closely parallel orientation, and which is afforded by the common mounting thereof on the platform. As a result thereof, however, there is produced the requirement for a heavy design construction for the platform with correspondingly technological regulating problems during the guidance or the conveying along of the large masses, quite independently of the only limited available installation spaces for such a platform as an equipment carrier. These limitations become particularly critical when a decidedly energy-rich laser beam is to be projected for the generation of which, inclusive of its auxiliary installation, there is required an extremely voluminous or bulky high-energy laser source.

When, as a consequence of such kinds of space and weight conditions the laser source can no longer be installed on the platform itself, in addition to the remaining installations which are to be oriented three-dimensionally, there can be contemplated the irradiation of mirror pivoting arrangement pursuant to the above-mentioned German AS 27 57 585 from a stationary high-energy laser source. However, because of the geometrical conditions, by means of such a pivoting mirror there can be obtained other projecting angles in space as would be at the concurrent activation of the platform for the three-dimensional orientation of the equipment which is carried thereby, which can again lead to orientation parallelism only with extraordinarily high demands on data processing in accordance with the measure of the geometric conditions for every possible spatial or three-dimensional angle.

SUMMARY OF THE INVENTION

Accordingly, in recognition of these conditions, it is an object of the present invention to so construct an arrangement of the above-mentioned type wherein the platform itself need not be also the carrier or support for a voluminous laser source, and nevertheless, without the requirement for auxiliary data processing technology, there is constantly ensured a fixed coupling of the orientation of the projected laser beam with the orientation of the equipment which is supported on the platform.

The foregoing object is inventively achieved in that, in the arrangement of the above-mentioned type, the laser soutce is stationarily arranged relative to the support of the platform apart from the platform, and the laser beam is oriented along the stationary axis with the movement of the platform.

Inasmuch as the laser source which is fixedly arranged with the movable platform orients the laser beam along the moving axis which is fixed relative to the platform, the exit direction of the laser beam on the platform is constantly fixedly coupled with the orientation of the latter, although the platform itself no longer carries the laser source. This facilitates a more compact and lighter; in effect, simply controllable platform with regard to control technology, whose surface for the installation of the additional equipment is no longer restricted by the take up of a laser source.

In conformance with the extent of the orientation of the equipment or installations carried on the platform, a deflecting mirror can be rigidly mounted on the platform in an extension of the pivot axis which is fixed relative to the platform, which determines the projecting direction of the laser beam relative to the orientation of the equipment, so that this opposite orientation will also be rigidly maintained even during pivotal movements of the platform.

At capabilities of movement about a plurality of axes, the platform is supported by a swivel structure. The laser source which is fixedly installed therewith will then irradiate its beam along the fixed pivot axis thereof, in which there is effected at the crossing points of the axes a beam deflection along the further axis, up to the beam exit through platform along the axis which is fixed relative to the platform.

It can be advantageous that, pursuant to a modification of the invention, this swivel construction is so assembled whereby the laser beam can be conducted through hollow spaces along the pivot axes. This facilitates a spreading of the laser beam with extremely low losses through the swivel construction along the pivot axes thereof at favorable constructional conditions for the fine adjustment and, when required, for an exchange of the deflecting mirror, as well as providing for accessability to the deflecting mirror with cooling media for conducting off the reflection heat loss during the utilization of high energy lasers.

BRIEF DESCRIPTION OF THE

Reference may now be had to the following detailed description of various novel features and advantages of the invention, taken in conjunction with the single figure of the drawing, schematically illustrating an embodiment for attaining the inventive object, wherein the drawing shows a platform which is movable about two axes and providing for the coupling in and projection of a laser beam.

DETAILED DESCRIPTION

The arrangement for the projection of a high-energy laser beam 1 which is illustrated in the single figure of the drawing, includes a platform 2 which is rotatable about on azimuthal axis 3 and tiltable about an inclination axis 4, so that the main surface plane of the platform 2 can assume, within the scope of the constructively predetermined pivoting bounds, a suitable orientation in semi-infinite space. Through the constructive formation of an additional pivotal degree of freedom, namely the tilting of both axes 3, 4 within the illustrated plane, the normal relative to the platform 2 can assume every spatial orientation, which has not been shown in the drawing to avoid unclarities. For the effectuation of the pivoting or swinging movements about the axes. 3, 4, there use can be made of gyroscopically stabilized platform controls or guidances of proven technology, for example with cardan linkage suspensions.

The platform 2 is the carrier or support for equipment 5 such as, for example, direction-finding or target tracking apparatuses, whose spatial orientation is provided by the momentary position of the platform 2; in effect, is controllable through the pivotal movements of the platform 2. The laser beam 1 should be projected in parallel with this equipment orientation.

In accordance with the inventive arrangement, a high-energy laser source 6 because of its volume and weight, in the interest of the lowest possible masses which must be moved during the pivoting of the platform 2, is not supported on the platform 2 in addition to the other equipment 5, but is fixedly installed relative to the spatially-fixed pivot axis (in the illustrated two-axes system, in effect fixed with respect to the inclination axis 4).

In this manner the laser beam 1 can be fixedly coupled into the swivel construction 7, within which through the intermediary of deflecting mirrors 8, the beam is conducted further along the further pivot axes (in the illustrated simplified embodiment along the movable azimuthal axis 3).

Normally, the equipment or installations 5 are oriented in parallel with the platform 2, so that also the laser beam 1 which exits along the last axis 3 which is fixed with respect to the platform from the swivel construction 7, should not be projected from the platform 2 in this axis direction. Consequently, a projecting mirror 9 is arranged on the platform above the piercing point of the axis 3 which is fixed relative to the platform, which determines the beam projecting direction in space; for example, as represented by the drawing in parallel with the platform 2. The platform 2 can carry optical elements 10 behind the projection mirror 9, which relate, for example, to arrangements for beam modulation or beam distribution. Since the platform 2 carries the projection mirror 9 and these elements 10, a single effected positional adjustment of the elements 10 relative to the laser beam 1 independently of the momentary platform orientation is always ensured; as well as the orientation of the laser beam 1 relative to the orientation of the equipment 5, due to the projection mirror 9 being fixedly positioned on the platform 2 always remaining assured, although the laser source 6 itself is not carried by the platform 2.

For the coupling in of the laser beam 1, and its deflection along the pivot axes 3, 4 up to its exit from the platform 2, the swivel construction 7 can be constituted of beam-conductive rods, for example, of polycrystalline germanium, which are coupled together at the locations of the deflector mirrors 8 at the axial crossings, under the interposition of a reflective coating 11, such as is indicated in the drawing for the embodiment of a two-axis swivel system through the joint surface 12 having an inclination of 45° relative to the two axes 3, 4.

A greater mechanical stability with improved adjusting capabilities for the deflector mirror 8 can be achieved when the swivel construction 7 is built up from hollow structural components; for example, from tubes 13 which are opened relative to each other at their junctures, along the axes 3, 4 of which there can be conducted the laser beam 1 through air or even through a vacuum, and thus can be guided through with lower losses than through an optical construction material. The free tube ends are supported in the azimuthal and inclination rotary bearings, 15, 16 so as to be pivotable about their axes 3, 4. Hereby, there can be concurrently provided for the inclination tube 14 a stationary axial support, whereas the azimuthal rotary bearing 15 also serves for the axial support of a platform mount 17 on the swivel construction 7.

What is claimed is:

1. A platform arrangement for the support of direction-finding and target tracking equipment and for the orientation of laser beams which are movable in space; said platform arrangement including a platform with target tracking and optical equipment; platform support swivel structure; means for pivoting said platform support swivel structure and said platform about a plurality of intersecting axes at predetermined orientations relative to each other; a laser source fixedly supported separately from and in proximity to said platform support swivel structure, said laser source projecting a laser beam into said platform support swivel structure along a first one of said axes which is fixedly oriented relative to said separate laser source; and means in said platform support swivel structure and on said platform for deflecting said laser beam at the intersections of said axes until said laser beam is projection into space along an axis fixedly oriented relative to said platform, said laser beam deflecting means including a projection mirror mounted on the platform in the laser beam projecting axis which is fixedly oriented relative to the platform.

2. Arrangement as claimed in claim 1, wherein said laser beam deflecting means in said platform support swivel structure comprises beam deflection mirrors arranged in the intersection of the pivoting axes for projecting said laser beam along said axes.

3. Arrangement as claimed in claim 2, wherein said platform support swivel structure comprises rods constituted of a laser beam-conductive material, said rods forming said axes through which the laser beam is conducted.

4. Arrangement as claimed in claim 3, wherein the ddeflection mirrors are formed through reflective coatings provided at the juncture of said rods.

5. Arrangement as claimed in claim 2, wherein the axes along which the laser beam is projected traverse hollow passageways in said platform support swivel structure, and said deflection mirrors are positioned at the intersections of the axes.

6. Arrangement as claimed in claim 5, wherein said platform support swivel structure comprises tubes forming said hollow passageways encompassing the pivoting axes.

* * * * *